(12) United States Patent
Siddhamalli et al.

(10) Patent No.: US 10,280,292 B2
(45) Date of Patent: May 7, 2019

(54) FLEXIBLE MATERIAL AND ARTICLES MADE THEREFROM

(75) Inventors: Sridhar Krishnamurthi Siddhamalli, Lutz, FL (US); Mark W. Simon, Pascoag, RI (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 13/234,740

(22) Filed: Sep. 16, 2011

(65) Prior Publication Data

US 2012/0070597 A1 Mar. 22, 2012

Related U.S. Application Data

(60) Provisional application No. 61/384,126, filed on Sep. 17, 2010.

(51) Int. Cl.
*C08L 23/12* (2006.01)
*C08L 53/00* (2006.01)
(Continued)

(52) U.S. Cl.
CPC .............. *C08L 23/02* (2013.01); *C08L 53/02* (2013.01); *Y10T 428/139* (2015.01)

(58) Field of Classification Search
CPC ......... A61B 10/0096; A61B 2017/1225; A61J 1/20; A61M 39/146; A61M 39/28; A61M 39/284; B32B 2439/80; B32B 27/00; B32B 27/304; B32B 27/306; B32B 27/32; B32B 27/322; C12M 23/20; C08L 53/02; C08L 23/02; Y10T 428/139

USPC ....... 428/36.9, 35.7, 36.91, 36.92, 220, 523, 428/35.2, 323, 423.1, 327, 375, 411.1, 428/474.4, 480, 516, 521, 522, 195.1, 428/212, 34.9, 413, 461, 500, 515, 131, 428/17, 206, 213, 338, 343, 34.1, 354, 428/35.1, 36.8, 421, 422, 462, 476.3, 483, 428/517, 519, 106, 116, 137, 138, 172,
(Continued)

(56) References Cited

U.S. PATENT DOCUMENTS 3,875,970 A * 4/1975 Fitter .................. F04B 43/0072
138/110
4,959,402 A * 9/1990 Williams et al. ............... 524/99
(Continued)

FOREIGN PATENT DOCUMENTS

CN 1315981 A 10/2001
DE 19815592 A1 10/1998
(Continued)

OTHER PUBLICATIONS

Modern Plastics; Harper, Charles A. (2000). Modern Plastics Handbook. McGraw-Hill. Online version available at: http://www.knovel.com/web/portal/browse/display?_EXT_KNOVEL_DISPLAY_bookid=1008&VerticalID=0.*
(Continued)

*Primary Examiner* — Gerard Higgins
*Assistant Examiner* — Kevin C Ortman, Jr.
(74) *Attorney, Agent, or Firm* — Abel Schillinger, LLP; Chi Suk Kim

(57) ABSTRACT

A flexible tubing material includes a mixture of a polyolefin and a styrenic based block copolymer, wherein the styrenic based block copolymer has an A-B-A block configuration and a molecular weight of at least about 350 kg/mol.

15 Claims, 3 Drawing Sheets

(51) Int. Cl.
*C08L 23/02* (2006.01)
*C08L 53/02* (2006.01)

(58) Field of Classification Search
USPC ...... 428/189, 209, 216, 304.4, 317.3, 318.4, 428/319.7, 319.9, 328, 339, 340, 34.3, 428/34.6, 34.8, 352, 355 EN, 355 N, 35.4, 428/35.8, 361, 364, 36.1, 36.4, 36.5, 36.6, 428/370, 373, 379, 402, 403, 407, 412, 428/41.8, 423.5, 424.8, 446, 447, 474.7, 428/474.9, 475.2, 475.5, 476.1, 476.9, 428/477.4, 479.3, 479.6, 489, 492, 494, 428/495, 512, 518, 520, 537.5, 54, 68, 428/704, 910
See application file for complete search history.

(56) References Cited

U.S. PATENT DOCUMENTS

| | | | |
|---|---|---|---|
| 5,106,917 A | | 4/1992 | Lee et al. |
| 5,274,035 A | * | 12/1993 | Chundury .................. 525/92 A |
| 5,654,364 A | * | 8/1997 | Bates ...................... C08C 19/02 |
| | | | 525/63 |
| 5,969,034 A | | 10/1999 | Modic |
| 6,057,401 A | | 5/2000 | Modic |
| 6,127,444 A | | 10/2000 | Kadri |
| 6,303,200 B1 | | 10/2001 | Woo et al. |
| 6,673,857 B1 | | 1/2004 | Knoll et al. |
| 6,833,413 B2 | | 12/2004 | Sasagawa et al. |
| 6,984,688 B2 | | 1/2006 | Gu |
| 7,226,649 B2 | * | 6/2007 | Shang ................. B23K 26/067 |
| | | | 138/137 |
| 7,582,702 B2 | | 9/2009 | Wright et al. |
| 7,585,916 B2 | | 9/2009 | Wright et al. |
| 8,052,822 B2 | * | 11/2011 | Datta ................... C08L 23/142 |
| | | | 156/242 |
| 2004/0072956 A1 | | 4/2004 | Degroot et al. |
| 2004/0132907 A1 | * | 7/2004 | Nakamura et al. ............. 525/88 |
| 2005/0197464 A1 | * | 9/2005 | Handlin et al. .............. 525/314 |
| 2006/0178543 A1 | * | 8/2006 | Krupinski ................ B32B 5/20 |
| | | | 585/428 |
| 2007/0240605 A1 | * | 10/2007 | Iyer ........................ C08L 23/10 |
| | | | 106/31.6 |
| 2008/0161485 A1 | * | 7/2008 | Suzuki ..................... C08F 8/04 |
| | | | 524/575 |
| 2009/0205776 A1 | | 8/2009 | Datta et al. |
| 2010/0035007 A1 | | 2/2010 | Inoue et al. |
| 2011/0319837 A1 | | 12/2011 | Uehara et al. |
| 2012/0190786 A1 | | 7/2012 | Sasaki |

FOREIGN PATENT DOCUMENTS

| | | |
|---|---|---|
| EP | 1584654 A1 | 10/2005 |
| JP | H07149953 A | 6/1995 |
| JP | H08113695 A | 5/1996 |
| JP | 2000103934 A | 4/2000 |
| JP | 2003105211 A | 4/2003 |
| WO | 95-33006 A1 | 12/1995 |
| WO | 2006020309 A1 | 2/2006 |
| WO | 2007-077176 A1 | 7/2007 |
| WO | 2008139512 A1 | 11/2008 |
| WO | 2009009372 A1 | 1/2009 |
| WO | 2010104068 A | 9/2010 |
| WO | 2011040586 A1 | 4/2011 |
| WO | 2012037462 A2 | 3/2012 |

OTHER PUBLICATIONS

Murray, Raymond L. (2009). Nuclear Energy—An Introduction to the Concepts, Systems, and Applications of Nuclear Processes (6th Edition). Elsevier.*
Rees, Herbert, (2002). Mold Engineering, 2nd ed., ISBN 1-56990-322-0.*
Modern Plastics; Harper, Charles A (2000) Modern Plastics Handbook p. 4.46. McGraw Hill. Online version available at ftp://mail.best-tech.com/Ebooks/Mechanical%20Engineering/Modern%20Plastics%20Handbook%20-%20C.%20Harper%20(2000)%20WW.pdf.*
KRATON, "KRATON G1652 Data Document," p. 1-2 , accessed Jan. 2016.*
PROFAX, PROFAX SA861, "LyondellBasell Industries—Polypropylene Random Copolymer," p. 1-2, accessed Jan. 2016.*
Vector (VECTOR 2518, "Styrene-butadiene-styrene (SBS) block copolymer," Dec. 2008, p. 1-2).*
International Search Report dated Apr. 26, 2012 from International Application No. PCT/US2011/051941 filed Sep. 16, 2011.
Dow, Process Oil Selection Guide, "ENGAGE Polyolefin Elastomer", pp. 1-9, published Aug. 2005.

* cited by examiner

FLEXIBLE MATERIAL AND ARTICLES MADE THEREFROM

CROSS-REFERENCE TO RELATED APPLICATION(S)

The present application claims priority from U.S. Provisional Patent Application No. 61/384,126, filed Sep. 17, 2010, entitled "Flexible Material and Articles Made Therefrom," naming inventor Sridhar K. Siddhamalli and Mark W. Simon, which application is incorporated by reference herein in its entirety.

FIELD OF THE DISCLOSURE

This disclosure, in general, relates to a flexible tubing material and articles made from the aforementioned material.

BACKGROUND

Currently, flexible medical tubing is used to transport any variety of liquids during medical procedures. A flexible polyvinyl chloride (PVC) is a typical material used for medical tubing due to their inherent flexibility and translucency. Unfortunately, polyvinyl chloride tubing has significant amounts of low-molecular weight chemicals that can be leached into the human body during medical treatments. Further, disposal of PVC-based waste by incineration causes environmental issues due to the release of toxic gases.

Alternative materials to flexible PVC have been adopted to make flexible medical tubing. Polymers that may be desired typically include those that are flexible, transparent, and appropriate for certain applications. Unfortunately, these polymers may not have all the physical or mechanical properties desired for flexible medical tubing applications. For instance, many of these polymers do not have a desirable pump life due to severe spallation and fouling. Further, many of these polymers may not have the clarity desired for visualization of fluid flow through the tubing. As a result, manufacturers are often left to choose the physical and mechanical properties they desire without an option as to whether it can have a useful life span.

As such, an improved polymeric material is desired.

SUMMARY

In a particular embodiment, a flexible tubing material includes a mixture of a polyolefin and a styrenic based block copolymer, wherein the styrenic based block copolymer has an A-B-A block configuration and a molecular weight of at least about 350 kg/mol.

In another exemplary embodiment, an article includes a mixture of a polyolefin and a styrenic based block copolymer, wherein the styrenic based block copolymer has an A-B-A block configuration and a molecular weight of at least about 350 kg/mol.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
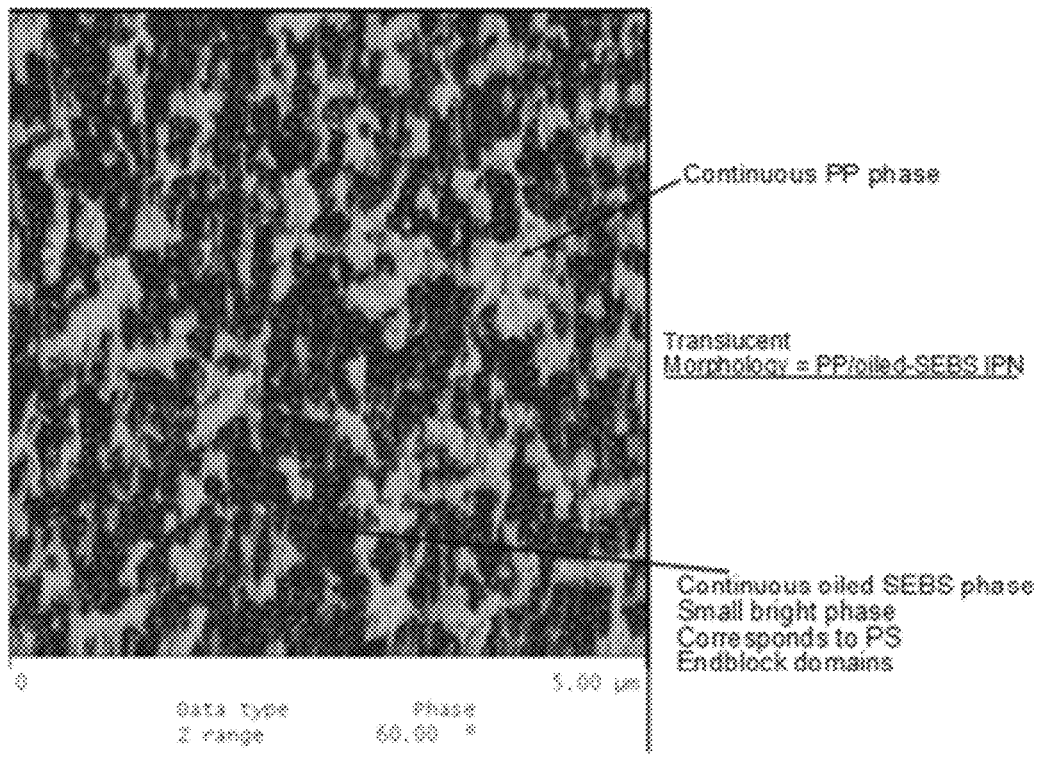
FIGS. 1, 2, and 3 include micrographs of exemplary tubes.

In a particular embodiment, an article includes a polymeric mixture of a polyolefin and a styrenic based block copolymer. The mixture of the polyolefin with the styrenic based block copolymer advantageously provides a polymeric material that can be formed into articles such as flexible tubing. In an example, the flexible tubing of the polyolefin with the styrenic based block copolymer has desirable pump performance. Further, the polymeric material provided can be sterilized and welded.

Typically, the styrenic based block copolymers is a multiblock copolymer, for example, a diblock, triblock, polyblock, or any combination thereof. In a particular embodiment, the styrenic based block copolymer is a triblock copolymer having ABA units. Typically, the A units are alkenyl arenes such as a styrene, an alpha-methylstyrene, para-methylstyrene, para-butyl styrene, or combination thereof. In a particular embodiment, the A units are styrene. In an embodiment, the B units include alkenes such as butadiene, isoprene, ethylene, butylene, propylene, or combination thereof. In a particular embodiment, the B units are ethylene, butylene, or combinations thereof.

Exemplary styrenic based block copolymers include triblock styrenic block copolymers (SBC) such as styrene-butadiene-styrene (SBS), styrene-isoprene-styrene (SIS), styrene-ethylene butylene-styrene (SEBS), styrene-ethylene propylene-styrene (SEPS), styrene-ethylene-ethylene-butadiene-styrene (SEEBS), styrene-ethylene-ethylene-propylene-styrene (SEEPS), styrene-isoprene-butadiene-styrene (SIBS), or combinations thereof. In a particular embodiment, the styrenic based block copolymer is styrene-ethylene butylene styrene (SEBS). Commercial examples include some grades of Kraton™ and Hybrar™ resins. In an embodiment, the styrenic based block copolymer is saturated, i.e. does not contain any free olefinic double bonds. In an embodiment, the styrenic based block copolymer contains at least one free olefinic double bond, i.e. an unsaturated double bond.

Typically, the styrenic based block copolymer has a molecular weight of at least about 350 kg/mol. In a particular embodiment, the styrenic based block copolymer has a molecular weight of about 350 kg/mol to about 500 kg/mol. In an embodiment, the styrenic based block copolymer has a viscosity of at least about 0.1 Pa·s, such as about 0.30 to about 0.35 Pa·s as measured at 5 weight percent solution in toluene at 25° C.

In an embodiment, the styrenic based block copolymer is present at an amount of at least 10% by weight, such as at least about 20% by weight, or even at least about 30% by weight of the total weight of the polymeric mixture. In an embodiment, the styrenic based block copolymer is present in an amount of about 10% by weight to about 50% by weight, such as about 15% by weight to about 30% by weight, or even about 20% by weight to about 30% by weight of the total weight of the polymeric mixture. Typically, the level of the styrenic based block copolymer present in the polymeric mixture may be optimized based on the final properties desired.

In a particular embodiment, the polymeric mixture includes a polyolefin. A typical polyolefin may include a homopolymer, a copolymer, a terpolymer, an alloy, or any combination thereof formed from a monomer, such as ethylene, propylene, butene, pentene, methyl pentene, octene, or any combination thereof. An exemplary polyolefin includes high density polyethylene (HDPE), medium density polyethylene (MDPE), low density polyethylene (LDPE), ultra or very low density polyethylene (VLDPE), ethylene propylene copolymer, ethylene butene copolymer, polypropylene (PP), polybutene, polybutylene, polypentene, polymethylpentene, polystyrene, ethylene propylene rubber (EPR), ethylene octene copolymer, blend thereof, mixture thereof, and the like. The polyolefin further includes olefin-based random copolymers, olefin-based impact copolymers, olefin-based block copolymers, olefin-based specialty elastomers, olefin-based specialty plastomers, blends thereof, mixture thereof, and the like. In an example, the polyolefin includes polypropylene. In a particular example, the polyolefin is a random propylene copolymer. In an embodiment, the polyolefin is a gamma stabilized polypropylene. Commercially available examples of polyolefins include polyethylene, polyethylene based elastomers such as Engage™ available from Dow Chemical Co. and polypropylene, polypropylene based elastomers such as Versify™ available from Dow Chemical Co., Vistamaxx™ available from Exxon Mobil Chemical, random polypropylene copolymers available from Flint Hills Resources, and the like.

The polyolefin may include any reasonable additives. In particular, the polyolefin may include an impact modifier and additives such as a heat stabilizer, an antioxidant, a UV stabilizer, a clarifying agent, a lubricant, a wax, an antistatic agent, or combination thereof. Exemplary radiation stabilizers include hindered amine light stabilizer (HALS) such as Tinuvin 770 supplied by CIBA. Exemplary impact modifiers include polyolefin elastomer such as Engage® that is polyethylene modified with butene or hexene as comonomers. Typically, an additive package in the polyolefin is present at an amount not greater than about 1% by weight and impact modifier in the polyolefin is present at an amount of not greater than about 10% weight or even not greater than about 5% by weight of the total weight of the polyolefin.

In an embodiment, the polyolefin is present in the mixture at an amount of at least 10% by weight, such as at least about 20% by weight, or even at least about 30% by weight of the total weight of the polymeric mixture. In an embodiment, the polyolefin is present in the mixture at an amount of about 10% by weight to about 50% by weight, such as about 15% by weight to about 30% by weight, or even about 20% by weight to about 30% by weight of the total weight of the polymeric mixture. Typically, the level of the polyolefin present in the polymeric mixture may be optimized based on the final properties desired.

In an embodiment, the mixture of the polyolefin and the styrenic based block copolymer are provided in a ratio to provide optimum properties based on the final properties desired. For instance, the polyolefin and the styrenic based block copolymer may be present in a ratio of about 1.2:1 to about 0.2:1.

In an embodiment, a plasticizer may be provided in the polymeric mixture. In a particular embodiment, the plasticizer is an oil. Any suitable oil may be envisioned. In a particular embodiment, the oil is mineral oil that is paraffinic, naphthenic, or a mixture thereof with substantially zero aromatic content. In a particular embodiment, a mineral oil may be used at an amount of about 0% by weight to about 70% by weight of the total weight of the polymeric mixture. In an embodiment, the mixtures are substantially plasticizer-free. "Substantially plasticizer-free" as used herein refers to a mixture that includes mineral oil present at less than about 0.1% by weight of the total weight of the mixture. For instance, the styrenic based block copolymers may be melt-processible without the addition of an extending oil or plasticizer.

In an exemplary embodiment, the polymeric mixture further includes any additive envisioned such as a tackifier, a heat stabilizer, a lubricant, a filler, an antioxidant, or any combination thereof. Exemplary heat stabilizers include Iraganox 1010 supplied by Ciba. Exemplary tackifiers include vinyl toluene-alpha methyl styrene and styrene-alpha methyl styrene copolymers. An exemplary tackifier includes Piccotex® available from Eastman Chemical Company. Exemplary lubricants include silicone oil, waxes, slip aids, antiblock agents, and the like. Exemplary lubricants further include silicone grafted polyolefin, polyethylene or polypropylene waxes, Oleic acid amide, erucamide, stearate, fatty acid esters, and the like. Typically, the lubricant may be present at less than about 2.0% by weight of the total weight of the polymeric mixture. In an embodiment, the lubricant may be present at less than about 0.5% by weight of the total weight of the polymeric mixture. Exemplary antioxidants include phenolic, hindered amine antioxidants, combinations thereof, and the like. Exemplary fillers include calcium carbonate, talc, radio-opaque fillers such as barium sulfate, bismuth oxychloride, any combinations thereof, and the like. Typically, a filler may be present at an amount of not greater than about 50% by weight of the total weight of the polymeric mixture, such as not greater than about 40% by weight of the total weight of the mixture, or even not greater than about 30% by weight of the total weight of the mixture. Alternatively, the mixture may be free of additives such as tackifiers, heat stabilizers, lubricants, fillers, and antioxidants.

The components of the mixture of the polyolefin and styrenic based block copolymer may be processed by any known method to form the polymeric mixture. In an embodiment, the polyolefin and styrenic based block copolymer may be melt processed by dry blending or compounding. The dry blend may be in powder, granular, or pellet form. The mixture can be made by a continuous twin-screw compounding process or batch related Banbury process. Pellets of these mixtures may then be fed into a single screw extruder to make articles such as flexible tubing products. Mixtures can also be mixed in a single-screw extruder equipped with mixing elements and then extruded directly into articles such as tubing products. In a particular embodiment, the mixture can be melt processed by any method envisioned known in the art such as laminating, casting, molding, extruding, and the like. In an embodiment, the mixture can be injection molded.

The polymeric mixtures advantageously can withstand sterilization processes. In an embodiment, the polymeric mixture may be sterilized by any method envisioned. For instance, the polymeric mixture is sterilized after an article is formed. Exemplary sterilization methods include steam, gamma, ethylene oxide, E-beam techniques, combinations thereof, and the like. In a particular embodiment, the polymeric mixture is sterilized by gamma irradiation. For instance, the polymeric mixture may be gamma sterilized at between about 25 kGy to about 50 kGy. In a particular embodiment, the polymeric mixture is sterilized by steam sterilization. In an exemplary embodiment, the polymeric mixture is heat-resistant to steam sterilization at temperatures up to about 130° C. for a time of up to about 45 minutes. In an embodiment, the polymeric mixture is heat resistant to steam sterilization at temperatures of up to about 135° C. for a time of up to about 15 minutes.

In an embodiment, the polymeric mixtures can be welded. Notably, "welding" and "sealing" can be used interchangeably and refers to welding two portions of an article formed of the polymeric mixture together. Further, welding includes flat seals as well as circumferential seals for tubing applications. Energy is typically applied with parameters sufficient to yield a seal that withstands a seal integrity pressure test of about 30 psi air pressure for about 30 minutes under dry and wet conditions. Any other welding/sealing methods can be envisioned, for example, welding by heat, vibration, ultrasonic, infared, radiofrequency (RF), combinations thereof, and the like.

In an embodiment, the polymeric mixture may be formed into a single layer article, a multi-layer article, or can be laminated, coated, or formed on a substrate. Multi-layer articles may include layers such as reinforcing layers, adhesive layers, barrier layers, chemically resistant layers, metal layers, any combination thereof, and the like. The mixture can be formed into any useful shape such as film, sheet, tubing, and the like. The polymeric mixture may adhere or bond to other substrates including polyolefins (polypropylene (PP), polyethylene (PE), and the like) and styrenics (polystyrene (PS), acrylonitrile butadiene styrene (ABS), high impact polystyrene (HIPS), and the like).

In a particular embodiment, the polymeric mixture may be used to produce tubing and hoses. For instance, the polymeric mixture can be used as tubing or hosing to produce low toxicity pump tubing, reinforced hosing, chemically resistant hosing, braided hosing, and low permeability hosing and tubing. Tubing includes an inner surface that defines a central lumen of the tube. For instance, tubing may be provided that has any useful diameter size for the particular application chosen. In an embodiment, the tubing may have an outside diameter (OD) of up to about 5.0 inches, such as about 0.25 inch, 0.50 inch, and 1.0 inch. In an embodiment, the tubing may have an inside diameter (ID) of about 0.03 inches to about 4.00 inches, such as about 0.06 inches to about 1.00 inches. Tubing of the polymeric mixture advantageously exhibits desired properties such as increased lifetime. For example, the tube may have a pump life greater than about 100 hours, such as greater than about 150 hours, or even greater than 200 hours as measured at 600 RPM using a L/S 17 Cole-Parmer peristaltic standard pump head and water as the pumping medium.

In an embodiment, the tubing produced by the polymeric mixture has desirable tube wear characteristics such as minimal spallation (internal) and fouling (external). In particular, spallation results in the generation of particles and debris in the fluid path and fouling results in gumminess and tackiness of the pump head. In a particular embodiment, the tube wear characteristics has a spallation and fouling of less than about 1.0% weight loss when tested using a L/S 17 Cole-Parmer peristaltic standard pump head. Further, the pump life has a dataset that has minimal statistical variation as indicated by standard deviation of less than about 10% of the data mean or average. In an embodiment, the flexible tube of the polymeric material has a volumetric flow rate reduction of less than 50%, such as less than about 30% of the initial starting value.

In embodiment, the resulting articles may have further desirable physical and mechanical properties. For instance, the articles are flexible, kink-resistant and appear transparent or at least translucent. For instance, the article may have a light transmission greater than about 2%, or greater than about 5% in the visible light wavelength range. In particular, the resulting articles have desirable flexibility and substantial clarity or translucency. For instance, the articles of the polymeric mixture may advantageously produce low durometer articles. For example, an article having a Shore A durometer of between about 35 and about 75, such as between about 55 to about 70 having desirable mechanical properties may be formed. Such properties are indicative of a flexible material.

In addition to desirable hardness, the articles have advantageous physical properties, such as a balance of any one or more of the properties of hardness, flexibility, surface lubricity, pump life, spallation, fouling, tensile strength, elongation, Shore A hardness, gamma resistance, weld strength, and seal integrity to an optimum level.

In an embodiment, the resulting article has desirable heat stability properties. In a particular embodiment, the resulting article has one more of the following heat resistance properties such as a higher burst resistance, a higher softening point, and/or a higher autoclaving temperature compared to currently available commercial products.

Applications for the polymeric mixture are numerous. In particular, the polymeric mixture is non-toxic, making the material useful for any application where no toxicity is desired. For example, the polymeric mixtures are substantially free of plasticizers or other low-molecular weight extenders that can be leached into the fluids it transfers. "Substantially free" as used herein refers to a polymeric mixture having a total organics content (TOC) (measured in accordance to ISO 15705 and EPA 410.4) of less than about 100 ppm. Further, the polymeric mixture has biocompatibility and animal derived component-free formulation ingredients. For instance, the polymeric mixture has potential for FDA, USP, EP, ISO, and other regulatory approvals. In an exemplary embodiment, the polymeric mixture may be used in applications such as industrial, medical, health care, biopharmaceutical, pharmaceutical, drinking water, food & beverage, laboratory, dairy, and the like. In an embodiment, the polymeric mixture may also be safely disposed as it generates substantially no toxic gases when incinerated and leaches no plasticizers into the environment if land filled.

EXAMPLES

Mixture of styrenic based block copolymer and a polyolefin.

A mixture of a polyolefin and styrenic based block copolymer is made with the following components as seen in Table 1 (New formulation). The ingredients of the following recipe are dry blended to homogenize the mix that is then melt compounded using a twin screw extruder. The pellets thus obtained are either tube extruded using a single screw extruder or injection molded.

TABLE 1

| New formulation | Weight % |
| --- | --- |
| SEBS resin | 22 |
| Oil | 54 |
| Polypropylene | 22.9 |
| Silicone Modifier | 1.0 |
| Irganox 1010 | 0.1 |

The SEBS resin has an ethylene-butylene rubber midblock and polystyrene end-blocks. The molecular weight of the SEBS is at least 350 kg/mol. The polypropylene is manufactured by Flint Hills Resources that is a random copolymer that is impact modified and radiation stabilized. Oil referenced above is a USP certified mineral oil. Irganox 1010 is a heat stabilizer. The mixture results in an optically transparent article. Following in Table 2 are the physical properties testing data for the New formulation.

TABLE 2

| New formulation | Nominal Value |
| --- | --- |
| Shore hardness | 65A |
| Tensile strength at 100% | 340 psi |

TABLE 2-continued

| New formulation | Nominal Value |
|---|---|
| Tensile strength at 300% | 470 psi |
| Tensile strength at break | 955 psi |
| Ultimate elongation | 690% |

The above recipe is extruded in to 0.250"×0.380" tubing. Gamma sterilization occurs at about 40-50 kGy and autoclaving at about 121° C. for about 30 minutes. Nominal values of the properties measured are contained in Table 3 as a comparison. Current thermoplastic elastomer (TPE) commercial offering available from Saint-Gobain Performance Plastics is used as the control. Also included in the dataset is competitive tubing that represents the competition for pump characteristics. Ultimate elongation is determined using an Instron instrument in accordance with ASTM D-412 testing methods. Pump life is measured on a Cole-palmer L/S standard pump head. Break strength (tensile strength at break) is measured according to ASTM D412. Internal wear (spallation), external wear (fouling), and flow rate reduction are measured on a Cole-Parmer peristaltic pump with a standard L/S 17 head run at 600 RPM and water as the pumping medium.

TABLE 3

|  | Current TPE | Competitive tubing | New formulation |
|---|---|---|---|
| Shore A | 60 | 66 | 65 |
| Break Strength (psi) Pre/Post Gamma sterilized | 800/800 | 1018/NDA | 955/760 |
| Ultimate Elongation (%) Pre/Post Gamma sterilized | 720/740 | 590/NDA | 690/700 |
| Pump life (Ave/St Dev in hrs), Gamma sterilized | 7/8 | 91/54 | 207/11 |
| Stopped/Failed | Failed | Failed | Stopped |
| Internal & External Tube wear (wt %), Gamma sterilized | NDA | 3.7 | 0.48 |
| Flow rate reduction from the start, % | Unable to measure due to spallation | Unable to measure due to spallation | 30 |

As seen in Table 3, the New formulation unexpectedly has better performance, particularly with pump life, internal and external tube wear, and flow rate reduction than current TPE and competitive tubing. In particular, the use of the polymeric mixture of the New formulation provides a pump life improved by greater than about 127% compared to the competition. Further, the internal and external tube wear is decreased by about 87% compared to the competitor. Also, the New formulation has significantly less variability in dataset as compared to the other 2 samples as tabulated above.

The New formulation is tested for its clarity. The formulation is not opaque but translucent as indicated by data presented below in Table 4. It especially has good contact clarity meaning the tubing made of the formulation shows visualization through the tube when filled with liquid.

TABLE 4

| Visible light wavelength, nm | Current TPE | New formulation |
|---|---|---|
|  | Light transmission, % | |
| 700 | 29.7 | 5.4 |
| 400 | 13.9 | 2.3 |

Wear testing is performed by Plint Testing of slabs at a speed of 10 Hz, a weight of 50N load with a stroke of 7 mm using a SS ⅜ inch 440 Ball. Readings are taken for 10 minutes with readings at 1 minute, 5 minutes, and 9 minutes. Measurements and testing was done in accordance with ASTM-G133. Results can be seen in Tables 5 and 6.

TABLE 5

| Time | Current TPE | New formulation |
|---|---|---|
|  | Coefficient of Friction (CoF) | |
| 1 minutes | 0.178 | 0.079 |
| 5 minutes | 0.104 | 0.077 |
| 9 minutes | 0.148 | 0.072 |
| Average | 0.143 | 0.076 |

TABLE 6

| Weight (g) | Current TPE | New formulation |
|---|---|---|
|  | Wear (% weight loss) | |
| Weight before | 4.974 | 4.199 |
| Weight after | 4.913 | 4.199 |
| % Weight loss | 1.224% | 0.000% |

Although not to be bound by theory, it is theorized that the excellent pump performance of clear thermoplastic elastomeric (TPE) tubing such as the New formulation is due to its lubricious nature. This is supported by wear testing and visual confirmation of the test samples. The New formulation shows no wear as evidenced by zero weight loss and no material being abraded. Furthermore, the Coefficient of Friction (CoF) characteristic is measured and the lower number for the New formulation indicates that its surface is smoother than standard, current TPE.

Figure 2:
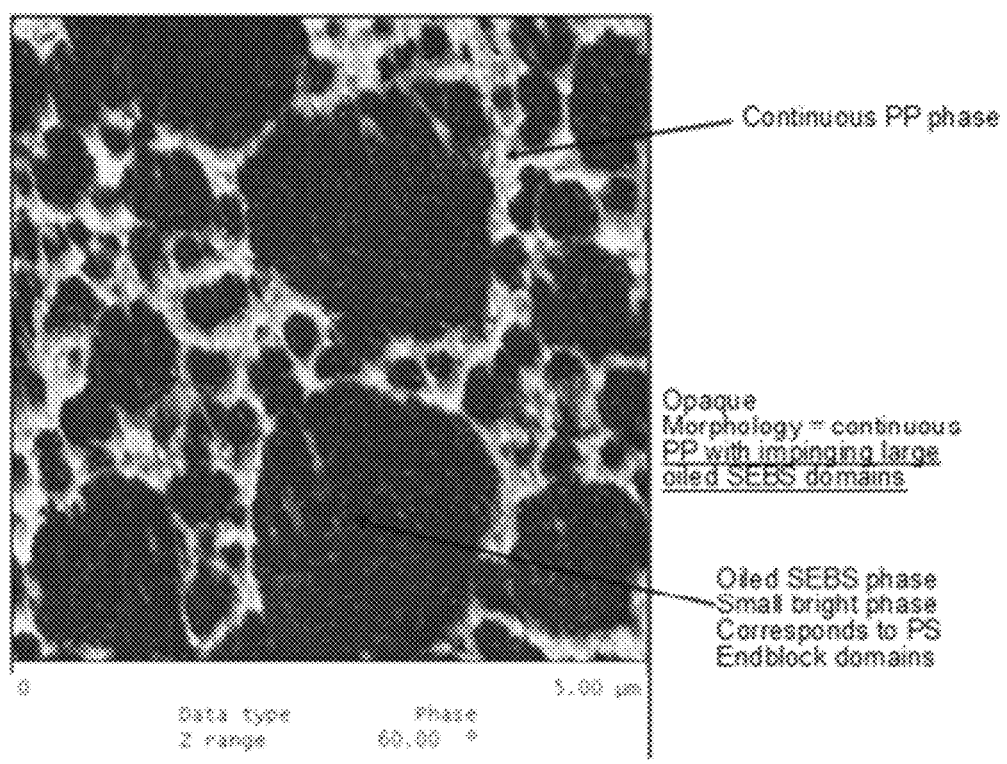
Figure 3:
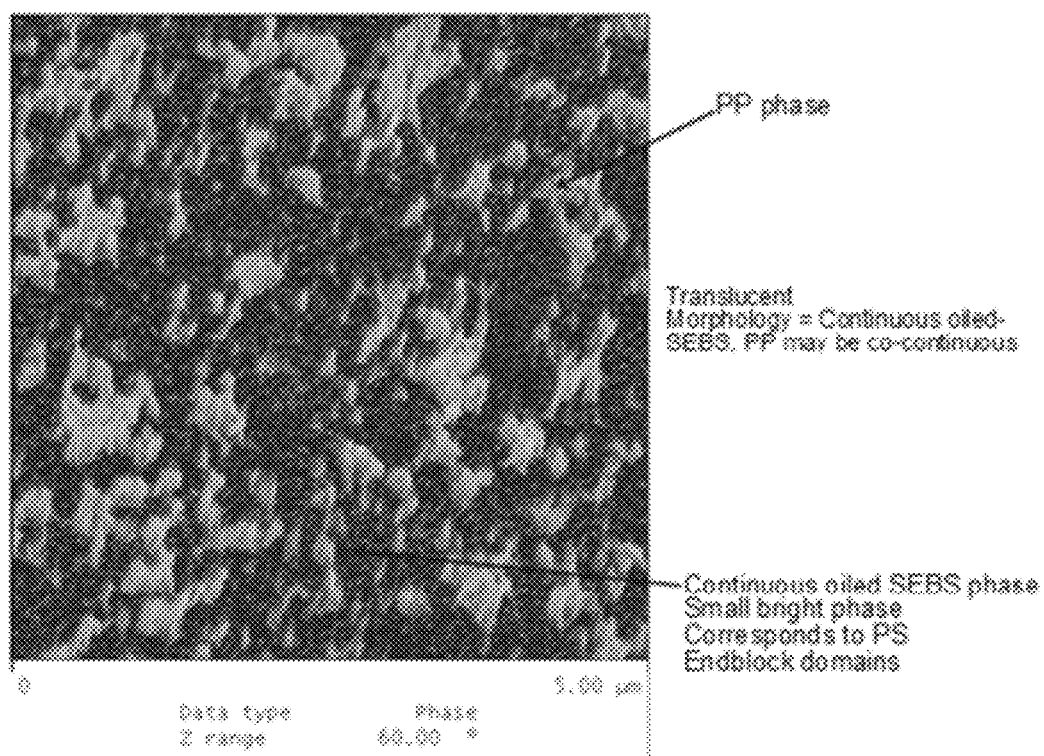

Tubing samples of the New formulation and 2 current TPE (TPE 1 and TPE 2) are analyzed for morphological properties. Phase morphology is studied using Atomic Force Microscopy (AFM). Cross-sections of each tubing sample is prepared so that the image is taken in the plane perpendicular to the direction of the extrusion. Samples are cryomicrotomed with a diamond knife held at −150° C. to prepare cryfaced surfaces for analysis with a Veeco MultiMode AFM. Silicon cantilevers with a nomical resonance frequency of 190 kHz are used, with medium-light tapping forces characterized by a 4.0 v free amplitude and a 0.9 set point reduction ratio. Micrograph results can be seen in FIGS. 1, 2, and 3.

As can be seen from the images, the micrographs for TPE 1 (FIG. 1) and TPE 2 (FIG. 3) are similar and exhibit co-continuous or interpenetrating network (IPN) type morphology where both the phases of polypropylene and oil containing SEBS coexist and have 3D spatial continuity. These images are in sharp contrast to that of the New formulation (FIG. 2) that displays droplet morphology where oil containing SEBS exists as large domains dispersed in polypropylene matrix. Clearly, the morphology of the New formulation is not co-continuous but rather, the styrenic based block copolymer has both large and small discrete domains interspersed within a continuous polyolefin matrix.

The New formulation has remarkably better pump performance than current TPE formulations. Although not to be bound by theory, it is theorized that the morphology of the New formulation provides the improved pump performance compared to current TPE formulations. Also, the New formulation is a TPE that has pump performance comparable to that of tubing made from thermoplastic vulcanizate (TPV) composition. The phase morphology of the New formulation resembles the phase morphology of TPV in that TPV has a polypropylene as continuous matrix and crosslinked rubber particles as the discrete phase.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A flexible biopharmaceutical peristaltic pump tube consisting of a mixture of a polyolefin, a styrenic based block copolymer, a plasticizer, a silicone oil lubricant, and an antioxidant, wherein the styrenic based block copolymer has an A-B-A block configuration, the A block is styrene, and the B block consists essentially of an ethylene and a butylene, the styrenic based block copolymer present at an amount of about 10% by weight to about 30% by weight of the total weight of the mixture and having a viscosity of at least about 0.1 Pa·s as measured at 5 weight percent solution in toluene at 25° C. and a molecular weight of about 350 kg/mol to about 500 kg/mol, wherein the polyolefin is present at an amount of about 10% by weight to about 30% by weight of the total weight of the mixture, wherein the plasticizer is a mineral oil present at an amount of about 40% by weight to about 70% by weight of the total weight of the mixture and the silicone oil lubricant is present at less than about 2.0% by weight of the total weight of the mixture, wherein the flexible biopharmaceutical peristaltic pump tube is circumferentially weldable and has a shore A of about 35 to about 70, having a pump life of greater than about 100 hours as measured at 600 RPM using Cole-Parmer peristaltic pump containing L/S 17 standard pump head with water as a medium.

2. The flexible biopharmaceutical peristaltic pump tube of claim 1, wherein the styrenic based block copolymer has a viscosity of about 0.3 Pa·s to about 0.35 Pa·s as measured at 5 weight percent solution in toluene at 25° C.

3. The flexible biopharmaceutical peristaltic pump tube of claim 1, wherein the polyolefin includes polyethylene, polypropylene, polybutylene, polymethylpentene, olefin-based random copolymers, olefin-based impact copolymers, olefin-based block copolymers, or blends thereof.

4. The flexible biopharmaceutical peristaltic pump tube of claim 1, wherein the polyolefin further comprises a radiation stabilizer and an impact modifier.

5. The flexible biopharmaceutical peristaltic pump tube of claim 1, wherein the polyolefin and the styrenic based block copolymer are present in a ratio of about 1.2:1 to about 0.2:1.

6. The flexible biopharmaceutical peristaltic pump tube of claim 1, having tube wear characteristics of spallation and fouling of less than about 1.0% weight loss over the pump life of the tube when tested using a L/S 17 Cole-Parmer peristaltic standard pump head.

7. The flexible biopharmaceutical peristaltic pump tube of claim 1, having a flow rate reduction of less than about 50% of the initial starting value over the pump life of the tube.

8. The flexible biopharmaceutical peristaltic pump tube of claim 1, wherein the tube is sterilized.

9. The flexible biopharmaceutical peristaltic pump tube of claim 1, wherein the styrenic based block copolymer has a phase morphology of droplets, domains, or combinations thereof dispersed in a matrix of polyolefin.

10. An article comprising a flexible biopharmaceutical peristaltic pump tube, the tube consisting of a mixture of a polyolefin, a styrenic based block copolymer, a plasticizer, a silicone oil lubricant, and an antioxidant, wherein the styrene based block copolymer has an A-B-A block configuration, the A block is styrene, and the B block consists essentially of an ethylene and a butylene, the styrenic based block copolymer present at an amount of about 10% by weight to about 30% by weight of the total weight of the mixture and having a viscosity of at least about 0.1 Pa·s as measured at 5 weight percent solution in toluene at 25° C. and a molecular weight of about 350 kg/mol to about 500 kg/mol, wherein the polyolefin is present at an amount of about 10% by weight to about 30% by weight of the total weight of the mixture, wherein the plasticizer is a mineral oil present at an amount of about 40% by weight to about 70% by weight of the total weight of the mixture and the silicone oil lubricant is present at less than about 2.0% by weight of the total weight of the mixture, wherein the flexible biopharmaceutical peristaltic pump tube is circumferentially weldable and has a shore A of about 35 to about 70, having a pump life of greater than about 100 hours as measured at 600 RPM using Cole-Parmer peristaltic pump containing L/S 17 standard pump head with water as a medium.

11. The article of claim 10, wherein the styrenic based block copolymer has a viscosity of about 0.3 Pa·s to about 0.35 Pa·s as measured at 5 weight percent solution in toluene at 25° C.

12. The article of claim 10, wherein the polyolefin includes polyethylene, polypropylene, polybutylene, polymethylpentene, olefin-based random copolymers, olefin-based impact copolymers, olefin-based block copolymers, or blends thereof.

13. The article of claim 10, wherein the polyolefin further comprises a radiation stabilizer and an impact modifier.

14. The article of claim 10, wherein the polyolefin and the styrenic based block copolymer are present in a ratio of about 1.2:1 to about 0.2:1.

15. The article of claim 10, wherein the styrenic based block copolymer has a phase morphology of droplets, domains, or combinations thereof dispersed in a matrix of polyolefin.

* * * * *